United States Patent [19]

Moser

[11] 4,289,880
[45] Sep. 15, 1981

[54] CATIONIC OXAZINE DYES

[75] Inventor: Peter Moser, Binningen, Switzerland

[73] Assignee: Ciba-Geigy Corporation, Ardsley, N.Y.

[21] Appl. No.: 56,664

[22] Filed: Jul. 11, 1979

[30] Foreign Application Priority Data

Jul. 21, 1978 [CH] Switzerland ............... 7907/78

[51] Int. Cl.$^3$ .......................................... C07D 265/38
[52] U.S. Cl. ................................. 544/103; 8/655; 8/657
[58] Field of Search ............... 544/103; 8/179, 655, 8/657

[56] References Cited

U.S. PATENT DOCUMENTS

| 3,629,248 | 12/1971 | Schafer et al. | 544/103 X |
| 3,731,222 | 5/1973 | Drexhage | 544/103 X |
| 3,894,014 | 7/1975 | Baumann et al. | 544/103 OR |
| 4,018,763 | 4/1977 | Moser | 544/103 |
| 4,125,717 | 11/1978 | Psaar | 544/102 |

FOREIGN PATENT DOCUMENTS

| 62367 | 8/1890 | Fed. Rep. of Germany | 544/103 |
| 74690 | 11/1890 | Fed. Rep. of Germany | 544/103 |
| 2458347 | 6/1976 | Fed. Rep. of Germany | 544/103 |
| 2121198 | 8/1972 | France | 544/103 |
| 113738 | 9/1977 | Japan | 544/103 |
| 7006700 | 11/1970 | Netherlands | 544/103 |
| 1410815 | 10/1975 | United Kingdom | 544/103 |
| 1411479 | 10/1975 | United Kingdom | 544/103 |
| 1442055 | 7/1976 | United Kingdom | 544/103 |

OTHER PUBLICATIONS

Canon KK, CPI-Profile Booklet 1978, abst. of Japanese Patent 78652Y/44 (E23 A89 G08 R24 (A13).
Mitsuhashi et al., Chem. Abst., vol. 88, abst. 144315w (1978).

Primary Examiner—John D. Randolph
Attorney, Agent, or Firm—Edward McC. Roberts; John P. Spitals

[57] ABSTRACT

There are described new blue cationic oxazine dyes of the formula

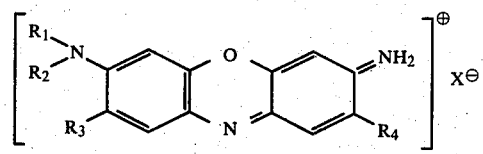

in which $R_1$, $R_2$, $R_3$ and $R_4$ independently of one another are each $C_{1-4}$-alkyl, with $R_1$ and $R_2$ together with the nitrogen atom also being able to form a heterocyclic ring, and $X^\ominus$ is an anion; these dyes are distinguished in particular by an excellent migration capacity on polyacrylonitrile fibres.

3 Claims, No Drawings

CATIONIC OXAZINE DYES

The present invention relates to new cationic oxazine dyes, to processes for producing them, and to their use for dyeing and printing materials, particularly textile materials, dyeable with cationic dyes.

New cationic oxazine dyes have been found which correspond to the general formula I

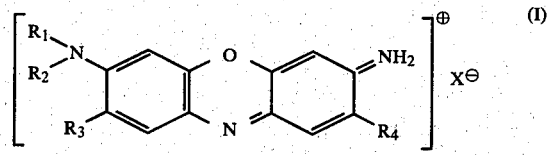

in which $R_1$, $R_2$, $R_3$, and $R_4$ independently of one another are each $C_{1-4}$-alkyl, with $R_1$ and $R_2$ together with the nitrogen atom also being able to form a heterocyclic ring, and $X^\ominus$ is an anion.

Preferred cationic oxazine dyes of the formula I are those in which $R_1$, $R_2$, $R_3$, and $R_4$ independently of one another are each methyl or ethyl.

A particularly valuable cationic oxazine dye by virtue of its good overall fastness properties is the dye of the formula Ia

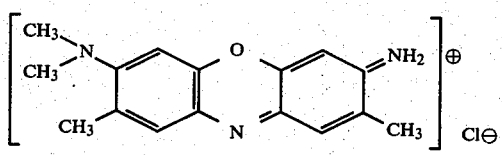

As alkyl having 1 to 4 carbon atoms, the substituents $R_1$, $R_2$, $R_3$ and $R_4$ in the formula I are the methyl, ethyl, n-propyl, isopropyl, n-, iso-, sec- and tert-butyl group.

When $R_1$ and $R_2$ together with the nitrogen atom form a heterocyclic ring, this is in particular a five- or six-membered N-heterocylic ring, which can contain further hetero atoms, such as nitrogen, oxygen and sulfur. Examples which may be mentioned are: pyrrolidine, morpholine and piperidine.

The dyes of the formula I can be produced by treating with nitrous acid a compound of the formula II

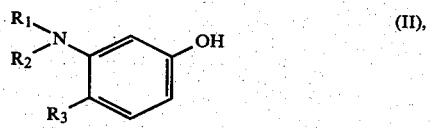

in which $R_1$, $R_2$ and $R_3$ have the meanings given above, in a known manner, in an aqueous or aqueous-organic medium, and condensing the resulting nitroso compound, advantageously without intermediate isolation, with a diamine of the formula III or IIIa

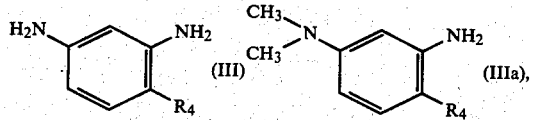

in which $R_4$ has the meaning already defined, in the presence of an acid HX, wherein X is an anion, and optionally in the presence of a condensing agent, for example zinc chloride.

The oxazine dye of the formula I can also be produced by treating with nitrous acid a compound of the formula IV

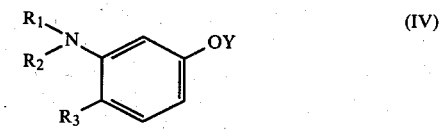

in which $R_1$, $R_2$ and $R_3$ have the meanings already defined, and Y is an unsubstituted or substituted lower alkyl group, for example methyl, ethyl or hydroxyethyl, and condensing the formed nitroso compound with an aminophenol of the formula V

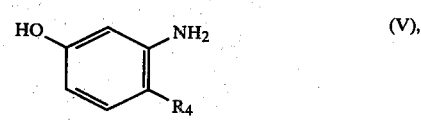

in which $R_4$ has the meaning already defined, in the presence of an acid HX, wherein X is an anion. The starting compounds of the formulae II, III, IIIa, IV and V are known.

Compounds of the formula II are for example: 3-dimethylamino-4-methyl-phenol, 3-N-methyl-N-ethylamino-4-methyl-phenol, 3-diethylamino-4-methyl-phenol and 3-dimethylamino-4-ethyl-phenol.

Compounds of the formulae III and IIIa are for example: 2-methyl-5-amino-aniline, 2-ethyl-5-amino-aniline and 2-butyl-5-amino-aniline or 2-methyl-5-dimethylamino-aniline.

Compounds of the formula IV are for example: 1-methoxy-4-methyl-5-dimethyl-aminobenzene, 1-ethoxy-4-methyl-5-dimethyl-aminobenzene and 1-hydroxyethoxy-4-methyl-5-dimethylaminobenzene, 1-methoxy-4-ethyl-5-dimethylaminobenzene or 1-methoxy-4-methyl-5-dipropylaminobenzene, 1-methoxy-4-methyl-5-N-methyl-N-ethylaminobenzene and 1-methoxy-4-methyl-5-diethylaminobenzene.

Suitable compounds of the formula V are for example: 3-amino-4-methyl-phenol, 3-amino-4-ethyl-phenol or 3-amino-4-butyl-phenol.

The condensation of the respective nitroso compounds is performed at temperatures of between 20 and 120° C., preferably between 50° and 100° C., in an acid medium. The halides, preferably the hydrochlorides, of the p-nitroso compounds are advantageously used, and the condensation reaction is performed in the presence of an acid HX, for example in the presence of hydrochloric acid, formic acid or acetic acid.

$X^\ominus$ as an anion denotes both organic and inorganic ions, for example the halide ion, such as the chloride, bromide or iodide ion, also the sulfate, methosulfate, aminosulfonate, perchlorate, carbonate, bicarbonate, phosphate, phosphomolybdic, phosphotungstic, phosphotungstomolybdic, benzenesulfonate, toluenesulfonate, 4-chlorobenzenesulfonate, naphthalenesulfonate, oxalate, maleinate, formiate, acetate, propionate, lactate, succinate, chloroacetate, tartrate, methanesulfonate, benzoate and rhodanide ions, or complex anions, such as that of chlorine-zinc double salts or tetrafluoroborate.

The new cationic oxazine dyes of the formula I are used for dyeing and, with the addition of binders and solvents, for printing materials which are dyeable with cationic dyes, particularly textile materials consisting for example advantageously of homo- or copolymers of acrylonitrile; or synthetic polyamides or polyesters which are modified by acid groups, and also mixtures thereof with polyester, polyamide, wool and cellulose-containing material, especially cotton. The new cationic oxazine dyes are also used for dyeing wet tow, plastics materials, leather and paper. Dyeing is preferably performed from an aqueous, neutral or weakly acid medium using the exhaust process, optionally under pressure, or using the continuous process. The textile material can be in the widest variety of forms, for example in the form of fibres, filaments, fabrics, knitwear, piece goods and finished articles, such as shirts or pullovers.

The new cationic oxazine dyes of the formula I according to the invention are pure blue dyes which are fast to light, which do not fluoresce, and which have an excellent migration capacity, particularly on polyacrylonitrile fibres. The shades of colour obtainable on these fibres are deeply coloured and possess good general fastness properties, such as good fastness to light, decatising, washing and perspiration.

Compared with the corresponding oxazine dye described in the German Patent Specification No. 74690, in which $R_3$ is hydrogen instead of methyl, the dye of the formula Ia has greater fastness to light and does not flouresce; it has a migration capacity considerably better than that of the corresponding oxazine dye described in the German Offenlegungsschrift No. 2,631,166, which has the $=NHC_2H_5$ group instead of the $=NH_2$ group; it has a substantially purer shade with a finer tone in artificial light than that of the corresponding oxazine dye known from the German Patent Specification No. 62367, in which $R_4$ is hydrogen instead of methyl; and it is purer, has greater affinity for the material and migrates better than the corresponding oxazine dye known from the German Offenlegungsschrift No. 2,518,587, in which $R_3$ is hydrogen instead of methyl, and $R_4$ is methoxy instead of methyl.

In the Examples which follow, 'parts' denote parts by weight, percentages are given as percent by weight, and the temperature values in degrees Centigrade.

EXAMPLE 1

15.1 parts of 3-dimethylamino-4-methylphenol are dissolved in 100 parts by volume of ethanol. There are then added 29 parts of 30% hydrochloric acid; the mixture is then cooled to about 5°, and 13.8 parts of an aqueous sodium nitrite solution (50%) are added dropwise with stirring. There is thus obtained a yellow-brown nitroso-hydrochloride suspension, which is further stirred for 1 hour at 5°-10°. The temperature is subsequently raised to 45°-50°, and a solution consisting of 15.0 parts of 2-amino-4-dimethylaminotoluene in 25 parts by volume of ethanol is added. The reaction temperature is further raised to 50°-55°, whereupon the formation of a blue oxazine dye rapidly commences. Stirring is continued for 2 hours at the last-mentioned temperature; this is then lowered to 0°-5°, and the dye which has precipitated is filtered off under suction. The dye of the formula

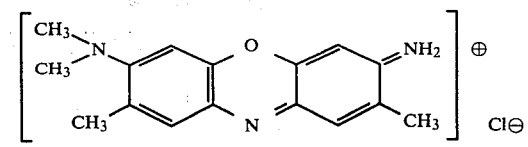

which has been washed free from the mother liquor using a total of 100 parts by volume of ethanol, is dried in vacuo at 60°-70°. The dye dyes polyacrylonitrile in pure neutral shades of blue having fastness to light and an excellent degree of levelness.

Following an analogous procedure and with the appropriate modification of the starting materials, there are obtained the oxazine dyes of the formula

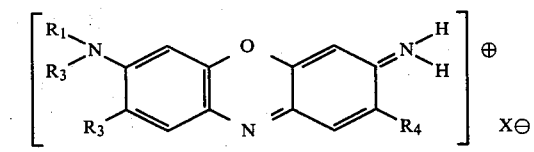

which are listed in the Table given below:

TABLE

| Example | $R_1$ | $R_2$ | $R_3$ | $R_4$ |
| --- | --- | --- | --- | --- |
| 2 | $CH_3$ | $C_2H_5$ | $CH_3$ | $CH_3$ |
| 3 | $C_2H_5$ | " | " | " |
| 4 | $CH_3$ | $CH_3$ | $C_2H_5$ | $CH_3$ |
| 5 | " | " | $CH_3$ | $C_2H_5$ |
| 6 | $\begin{array}{c}CH_2-CH_2\\|\phantom{xxx}\diagdown N- \\ CH_2-CH_2\diagup\end{array}$ | | " | $CH_3$ |
| 7 | $O\begin{array}{c}\diagup CH_2CH_2\diagdown\\\diagdown CH_2CH_2\diagup N-\end{array}$ | | " | " |

These oxazine dyes dye polyacrylonitrile materials in neutral blue shades.

EXAMPLE 8

2 g of the cationic dye produced according to Example 1 is stirred to a paste with 2 g of 40% acetic acid, and taken into solution by the addition of 4000 g of hot water. There are subsequently added 1 g of sodium acetate and 2 g of an addition product of 15 to 20 equivalents of ethylene oxide with N-octadecyldiethylenetriamine, which product has been quaternised with dimethyl-sulfate; and 100 g of polyacrylonitrile fabric is then introduced at 60°. The bath is heated within 30 minutes to 100°, and the material is dyed in the boiling liquor for 90 minutes. The liquor is afterwards allowed to cool to 60° in the course of 30 minutes, and the dyed material is then removed, and finally rinsed with lukewarm water and with cold water.

A pure neutral blue polyacrylonitrile dyeing having fastness to light is obtained.

EXAMPLE 9

A polyacrylonitrile copolymer consisting of 93% of acrylonitrile and 7% of vinyl acetate is dissolved in dimethylacetamide to give a 15% solution. The spinning solution is then extruded into a spinning bath which consists of 40% of dimethylacetamide and 60% of water. The resulting tow is subsequently drawn by known methods, and freed from dimethylacetamide by rinsing with hot water and cold water.

This wet tow is dyed by immersion in an aqueous bath at 42° having the following composition:
 9 parts of dye according to Example 1 per liter, pH-value 4.5 with acetic acid.

The contact time "tow/dye liquor" is 2 seconds. The excess dye liquor is subsequently squeezed out, and the tow is fed into the dryer. A tow dyed in a neutral blue shade having good fastness properties is obtained.

EXAMPLE 10

1 part of the cationic dye produced according to Example 1 is stirred to a paste with 2 parts of 80% acetic acid, and taken into solution by the addition of 4000 parts of warm water. There are then added 1 part of sodium acetate and 10 parts of calcined sodium sulfate, and 100 parts of polyacrylonitrile fabric are introduced into the bath at 80°. The bath is heated to 100° within 30 minutes, and the material is dyed in the boiling liquor for 60 minutes. The bath is then allowed to cool; the dyed material is rinsed, centrifuged and dried. A very level, pure neutral blue polyacrylonitrile dyeing having good fastness to light is obtained.

EXAMPLE 11

A printing paste is prepared consisting of:
 25 parts of a dye obtained according to Example 1,
 30 parts of thiodiglycol,
 20 parts of acetic acid (80%),
 350 parts of boiling water,
 500 parts of locust bean flour thickening,
 30 parts of tartaric acid 1:1,
 15 parts of di-($\beta$-cyanoethyl)-formamide, and
 30 parts of a naphthalenesulfonic acid/formaldehyde condensation product.

A polyacrylonitrile fabric printed with this printing paste is subsequently fixed for 20 to 30 minutes at 101° to 103° on a HT suspension loop steamer, and finished in the customary manner. A blue printing is obtained.

What is claimed is:

1. A cationic oxazine dye of the formula I

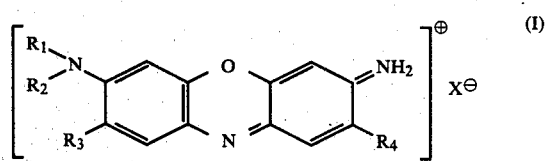

in which $R_1$, $R_2$, $R_3$ and $R_4$ independently of one another are each $C_{1-4}$-alkyl, with $R_1$ and $R_2$ together with the nitrogen atom also being able to form a heterocyclic ring, and $X^\ominus$ is an anion.

2. A cationic oxazine dye according to claim 1, wherein $R_1$, $R_2$, $R_3$ and $R_4$ independently of one another are each methyl or ethyl.

3. A cationic oxazine dye according to claim 1, wherein $R_1$, $R_2$, $R_3$ and $R_4$ are each methyl.

* * * * *